United States Patent
Burgess et al.

(10) Patent No.: US 9,710,229 B2
(45) Date of Patent: Jul. 18, 2017

(54) APPARATUS AND METHOD FOR PERFORMING FLOATING-POINT SQUARE ROOT OPERATION

(71) Applicant: ARM LIMITED, Cambridge (GB)

(72) Inventors: Neil Burgess, Cambridge (GB); David Raymond Lutz, Austin, TX (US)

(73) Assignee: ARM Limited, Cambridge (GB)

( * ) Notice: Subject to any disclaimer, the term of this patent is extended or adjusted under 35 U.S.C. 154(b) by 232 days.

(21) Appl. No.: 14/728,085

(22) Filed: Jun. 2, 2015

(65) Prior Publication Data

US 2016/0026437 A1    Jan. 28, 2016

(30) Foreign Application Priority Data

Jul. 24, 2014  (GB) .................................. 1413127.0

(51) Int. Cl.
*G06F 7/552* (2006.01)
*G06F 7/483* (2006.01)

(52) U.S. Cl.
CPC ............ *G06F 7/5525* (2013.01); *G06F 7/483* (2013.01)

(58) Field of Classification Search
CPC .............................. G06F 7/552–7/5525; G06F 2207/5526–2207/5528; G06F 2207/5521; G06F 2101/08
USPC ................................................ 708/500, 605
See application file for complete search history.

(56) References Cited

U.S. PATENT DOCUMENTS

| 4,336,599 A | 6/1982 | Wong |
| 2007/0083587 A1* | 4/2007 | Roh ...................... G06F 7/5525 708/605 |
| 2012/0011182 A1 | 1/2012 | Raafat et al. |

FOREIGN PATENT DOCUMENTS

GB    2528497 A  *  1/2016  ........... G06F 7/5525

OTHER PUBLICATIONS

Search Report for GB 1413127.0 dated Jan. 22, 2015, three pages.
S. Oberman, "Floating Point Division and Square Root Algorithms and Implementation in the AMD-K7™ Microprocessor", *California Microprocessor Division*, Apr. 14, 1999, 10 pages.

* cited by examiner

*Primary Examiner* — Matthew Sandifer
(74) *Attorney, Agent, or Firm* — Nixon & Vanderhye P.C.

(57) ABSTRACT

A data processing apparatus has a processing circuitry for performing a floating-point square root operation on a radicand value R to generate a result value. The processing circuitry has first square root processing circuitry for processing radicand values R which are not an exact power of two and second square root processing circuitry for processing radicand values which are an exact power of 2. Power-of-two detection circuitry detects whether the radicand value is an exact power of two and selects the output of the first or second square root processing circuitry as appropriate. This allows the result to be generated in fewer processing cycles when the radicand is a power of 2.

19 Claims, 9 Drawing Sheets single precision

| 1 bit | 8 bits | 23 bits |
|---|---|---|
| S | E | F |

$E$ = 11111111    special number    (e.g. NaN, ∞)

$E$ = 00000000    zero or subnormal    $(-1)^S \times 0 \cdot F \times 2^{(1-127)}$ $E$ = other          normal                    $(-1)^S \times 1 \cdot F \times 2^{(E-127)}$
                                                                                      ↑
                                                                                    bias double precision

| 1 bit | 11 bits | 52 bits |
|---|---|---|
| S | E | F |

$E$ = 111 1111 1111    special number $E$ = 000 0000 0000    zero or subnormal    $(-1)^S \times 0 \cdot F \times 2^{(1-1023)}$ $E$ = other                    normal                      $(-1)^S \times 1 \cdot F \times 2^{(E-1023)}$
                                                                                                ↑
                                                                                              bias

FIG. 1 if normal: $E_{eff} = E_R - bias$ if subnormal: $E_{eff} = -bias - CLZ(F_R)$

| | $res = \sqrt{R}$ $E_{eff}$ even | $res = \sqrt{R}$ $E_{eff}$ odd | $res = \sqrt{\frac{1}{R}}$ $E_{eff}$ even | $res = \sqrt{\frac{1}{R}}$ $E_{eff}$ odd |
|---|---|---|---|---|
| result mantissa | $= 1 \cdot 0$ | $= \sqrt{2}$ (rounded) | $= 1.0$ | $= \sqrt{2}$ (rounded) |
| result exponent | $= \dfrac{E_{eff}}{2}$ | $= \dfrac{E_{eff} - 1}{2}$ | $= \dfrac{-E_{eff}}{2}$ | $= \dfrac{-E_{eff} - 1}{2}$ | normal R = $2^{(\text{even no.})}$         res = $\sqrt{R}$ e.g.1     $R = 1 \cdot 0 \times 2^{56}$ $F_R$ = (1·) 0000 ..     $E_R$ = 100 0011 0111
                               ↓ invert MSB 000 0011 0111
                               ↓ right shift 1 place
                            000 0001 1011
                               ↓ invert msb $F_{res}$ = (1·) 0000 ...     $E_{res}$ = 100 0001 1011

Res = $1 \cdot 0 \times 2^{28}$ e.g.2     $R = 1 \cdot 0 \times 2^{-56}$ $F_R$ = (1·) 0000 ...     $E_R$ = 011 1100 0111
                               ↓ invert MSB 111 1100 0111
                               ↓ right shift 1 place
                            111 1110 0011
                               ↓ invert msb $F_{res}$ = (1·) 0000 ...     $E_{res}$ = 011 1110 0011

Res = $1 \cdot 0 \times 2^{-28}$

FIG. 8

| normal R = $2^{(\text{odd no.})}$ | res = $\sqrt{R}$ |
|---|---| e.g.1   $R = 1\cdot 0 \times 2^{57}$ $F_R = (1\cdot) 0000..$     $E_R = 100\ 0011\ 1000$ ↓ invert MSB $000\ 0011\ 1000$ ↓ subtract 1

$000\ 0011\ 0111$

↓ right shift 1 place $000\ 0001\ 1011$

↓ invert msb $F_{res} = (1\cdot) 0110\ 1011 ...$     $E_{res} = 100\ 0001\ 1011$ $(F_{res} = 1\cdot6A09E667F3BCC\_9)$     res $= \sqrt{2} \times 2^{28}$ e.g.2   $R = 1\cdot 0 \times 2^{-55}$     $E_R = 011\ 1100\ 1000$ ↓ invert MSB $111\ 1100\ 1000$ ↓ subtract 1

$111\ 1100\ 0111$

↓ right shift 1 place $111\ 1110\ 0011$

↓ invert msb $F_{res} = (1\cdot) 0110\ 1011 ...$     $E_{res} = 011\ 1110\ 0011$ $(F_{res} = 1\cdot6A09E667F3BCC\_9)$     res $= \sqrt{2} \times 2^{-28}$

FIG. 9 subnormal R = 2^(even no.)          res = √R̄

$R = 1.0 \times 2^{-1034}$ $F_R$ = 0· 0000 0000 0001 ...      $E_R$ = 000 0000 0000

($\rightarrow E_{eff}$ = -1023 - 11 = -1034)

CLZ ($F_R$) = 000 0000 1011 (=11)
↓ invert CLZ
111 1111 0100
↓ invert msb
011 1111 0100
↓ right shift 1 place $F_{res}$ = (1·) 0     $E_{res}$ = 001 1111 1010 res = $1.0 \times 2^{-517}$

FIG. 10 subnormal $R = 2^{(odd\ no.)}$           $res = \sqrt{R}$ $R = 1 \cdot 0 \times 2^{-1033}$ $F_R = 0 \cdot 0000\ 0000\ 0010\ ...$      $E_R = 000\ 0000\ 0000$ ($\rightarrow E_{eff} = -1023 - 10 = -1033$)

$CLZ(F_R) = 000\ 0000\ 1010\ (=10)$ $\downarrow$ invert 111 1111 0101

$\downarrow$ invert msb 011 1111 0101

$\downarrow$ right shift 1 place $F_{res} = 1 \cdot 0110\ 1011\ ...$      $E_{res} = 001\ 1111\ 1010$ ($F_{res} = 1 \cdot 6A09E667F3BCC\_9$)

$res = \sqrt{2} \times 2^{-517}$

FIG. 11

APPARATUS AND METHOD FOR PERFORMING FLOATING-POINT SQUARE ROOT OPERATION

This application claims priority to GB Patent Application No. 1413127.0 filed 24 Jul. 2014, the entire content of which is hereby incorporated by reference.

BACKGROUND

Technical Field

The present technique relates to the field of data processing. More particularly, the present technique relates to an apparatus and method for performing a floating-point square root operation.

Technical Background

In floating-point representation, numbers are represented using a mantissa (also known as a significand) 1.F or 0.F, an exponent E and a sign bit S. The sign bit represents whether the floating-point number is positive or negative, the mantissa represents the significant digits of the floating-point number, and the exponent represents the position of the radix point (also known as a binary point) relative to the mantissa. By varying the value of the exponent, the radix point can "float" left and right within the mantissa. This means that for a predetermined number of bits, a floating-point representation can represent a wider range of numbers than a fixed point representation (in which the radix point has a fixed location within the mantissa). However, the extra range is achieved at the expense of reduced precision since some of the bits are used to store the exponent.

One example of a floating-point arithmetic operation is a floating-point square root operation which takes a radicand value having a radicand exponent and a radicand mantissa and determines a square root of either the radicand value or the reciprocal of the radicand value, to generate a result value having a result exponent and a result mantissa. The present technique seeks to improve processing performance for this type of operation.

SUMMARY

Viewed from one aspect, the present technique provides a data processing apparatus comprising:

processing circuitry configured to perform a floating-point square root operation for determining a square root of a radicand value R having a radicand exponent and a radicand mantissa to generate a result value having a result exponent and a result mantissa;

wherein the processing circuitry comprises:

first square root processing circuitry configured to perform the floating-point square root operation for radicand values which are not an exact power of two;

second square root processing circuitry configured to perform the floating-point square root operation for radicand values which are an exact power of two, wherein the second square root processing circuitry is configured to generate the result value in fewer processing cycles than the first square root processing circuitry; and power-of-two detection circuitry configured to detect whether the radicand value is an exact power of two, to control the processing circuitry to output the result value generated by the first square root processing circuitry if the radicand value is not an exact power of two, and to control the processing circuitry to output the result value generated by the second square root processing circuitry if the radicand value is an exact power of two.

Viewed from another aspect, the present technique provides a data processing apparatus comprising:

processing means for performing a floating-point square root operation for determining a square root of a radicand value R having a radicand exponent and a radicand mantissa to generate a result value having a result exponent and a result mantissa;

wherein the processing means comprises:

first square root processing means for performing the floating-point square root operation for radicand values which are not an exact power of two;

second square root processing means for performing the floating-point square root operation for radicand values which are an exact power of two, wherein the second square root processing circuitry is configured to generate the result value in fewer processing cycles than the first square root processing circuitry; and power-of-two detection means for detecting whether the radicand value is an exact power of two, controlling the processing means to output the result value generated by the first square root processing means if the radicand value is not an exact power of two, and controlling the processing means to output the result value generated by the second square root processing means if the radicand value is an exact power of two.

Viewed from a further aspect, the present technique provides a method for performing a floating-point square root operation for determining a square root of a radicand value R having a radicand exponent and a radicand mantissa to generate a result value having a result exponent and a result mantissa; the method comprising:

detecting whether the radicand value is an exact power of two;

if the radicand value is not an exact power of two, outputting the result value generated by first square root processing circuitry configured to perform the floating-point square root operation for radicand values which are not an exact power of two; and if the radicand value is an exact power of two, outputting the result value generated by second square root processing circuitry configured to perform the floating-point square root operation for radicand values which are an exact power of two, wherein the second square root processing circuitry is configured to generate the result value in fewer processing cycles than the first square root processing circuitry.

The above, and other objects, features and advantages will be apparent from the following detailed description of illustrative embodiments which is to be read in connection with the accompanying drawings.

BRIEF DESCRIPTION OF THE DRAWINGS

Further aspects, features and advantages of the present technique are described in the description of examples below, in which:

FIG. 1 illustrates floating-point number representation;

FIG. 8 shows examples of performing a floating-point square root operation on a normal radicand value which is an even power of 2;

FIG. 9 shows an example where the radicand is a normal odd power of 2;

FIG. 10 shows an example where the radicand is subnormal and an even power of 2; and FIG. 11 shows an example where the radicand is subnormal and an odd power of 2.

DESCRIPTION OF EXAMPLES

Figure 2:
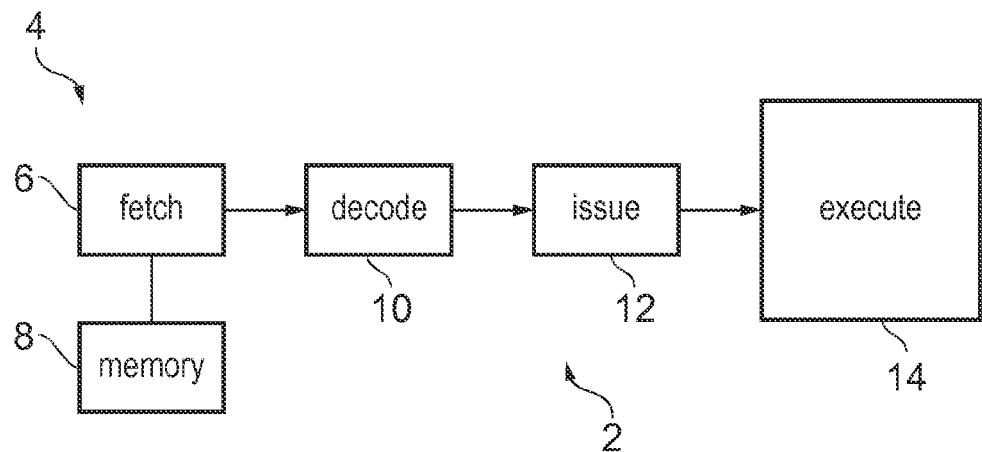
FIG. 2 shows an example of a data processing apparatus.

The present technique recognises that a floating-point square root operation can be reasonably costly for a data processing apparatus to perform in terms of the time taken and energy consumed. Often the square root is found by an iterative process which takes many processing cycles and requires reasonably complicated circuitry. The inventors of the present technique recognised that the cost of performing a full square root determination can be avoided when the radicand value is an exact power of two, because in this case the result exponent and result mantissa can be determined relatively quickly without invoking the full square root processing circuitry. Therefore, in addition to first square root processing circuitry for performing the floating-point square root operation for radicand values which are not an exact power of two, the apparatus is also provided with second square root processing circuitry which performs the floating-point square root operation for radicand values which are an exact power of two. The second square root processing circuitry can generate the result in fewer cycles than the first square root processing circuitry when the radicand is a power of two. Power-of-two detection circuitry detects whether the radicand value is an exact power of two, and controls the processing circuitry to output the result generated by the first square root processing circuitry if the radicand value is not an exact power of two and output the result value generated by the second square root processing circuitry if the radicand value is an exact power of two.

It may seem counterintuitive to provide additional processing circuitry for handling the special case when the radicand value is an exact power of two, since the first square root processing circuitry for handling arbitrary non-power-of-two radicand values is generally capable of also performing the square root operation for power-of-two radicand values. However, the little additional circuit area and leakage overhead is more than compensated for by the fact that the second square root processing circuitry can generate the result value in fewer processing cycles than the first square root processing circuitry. As power of two values for the radicand tend to occur surprisingly often, and many cycles can be saved by using the second square root processing circuitry when possible for an exact power of two, this approach provides a significant performance improvement.

The first square root processing circuitry may perform floating-point square root operations using any known technique, such as the Newton-Raphson method or the SRT method. Hence, the first square root processing circuitry may be a general circuit which can determine the square root of any arbitrary radicand value. On the other hand, the second square root processing circuitry may be a smaller circuit which can only generate square root results for radicand values which are an exact power of two. In some systems the first and second square root processing circuitry may be entirely separate. In other cases, the second square root processing circuitry may share some circuitry with the first square root processing circuitry or with another part of the processing circuitry.

In some implementations, the power-of-two detection circuitry could detect whether the radicand value R is an exact power of two, before the first or second square root processing circuitry is triggered to start performing the floating-point square root operation. This approach can reduce dynamic power consumption since only the one of the first and second square root processing circuitry that is actually required could be triggered to process the radicand value. However, this approach may delay obtaining the result value since it may take some time to detect whether the radicand value is an exact power of two, which may delay the square root operation even further when the radicand is not a power of two.

Therefore, to improve performance the power-of-two detection circuitry may detect whether the radicand value is an exact power of two in parallel with the first square root processing circuitry starting to perform the floating-point square root operation on the radicand value. In this way, the power-of-two detection does not delay the floating-point square root operation performed by the first square root processing circuitry. If the power-of-two detection circuitry detects that the radicand value is an exact power of two, then the result generated by the first square root processing circuitry can be ignored and instead the output of the second square root processing circuitry may be used. In some systems the power-of-two detection may also be performed in parallel with the second square root processing circuitry starting to perform the floating-point square root operation.

The power-of-two detection circuitry may detect whether the radicand value is an exact power of two in different ways, depending on whether the radicand value is normal or subnormal. For normal values, the radicand value is an exact power of two if the radicand mantissa has a value of 1.0. In most floating-point number representations, the leading one of the mantissa is implicit and the stored representation of the radicand mantissa would only include the fractional bits of the mantissa, so for an exact power of two the stored mantissa value would have all its bits set to 0. For example, NOR gates could be used to check whether the mantissa is equal to 0. On the other hand, for subnormal values, the radicand value is an exact power of two if the radicand mantissa includes only one bit having a value of 1 and all the other bits have a value of zero. This can be detected for example using a network of OR gates and XOR gates. Hence, a few additional logic gates may be provided for performing the power-of-two detection.

The processing circuitry may be able to perform different types of floating-point square root operation. One example is a non-reciprocal floating-point square root operation for generating the result value equal to the square root of the radicand value, i.e. $\sqrt{R}$. Another example is a reciprocal floating-point square root operation for generating the result value equal to the square root of the reciprocal of the radicand value, i.e. $\sqrt{\dfrac{1}{R}}$.

Unless otherwise specified, references to the floating-point square root operation in the present application should be construed as referring to either the non-reciprocal or the reciprocal version of the floating-point square root operation. In practice, the result of one operation may be obtained by obtaining the reciprocal of the result of the other operation.

In general, the second square root processing circuitry may generate the result value with the result mantissa having a predetermined mantissa value and the result exponent having a value corresponding to half an adjusted exponent (which corresponds to an adjusted version of the radicand exponent). The predetermined mantissa value and the adjusted exponent can be selected based on whether the radicand value R is equal to two to the power of an even number, or equal to two to the power of an odd number. The adjusted exponent may also depend on the type of operation being performed (whether the operation is the non-reciprocal or reciprocal square root operation). In all power-of-two cases, this avoids the need to perform an iterative or digit-recurrence process for determining the square root value. The second square root processing circuitry can simply set the result mantissa to one of a limited number of predetermined values and determine the result exponent using a relatively simple transformation of the radicand exponent. The adjusted exponent is halved because for an exact power of two, taking the square root halves the exponent. The adjustment to the exponent accounts for cases when the radicand is an odd-numbered power of two or when the reciprocal square root operation is performed. In general, these operations can be performed in relatively few cycles, many cycles fewer than the full floating-point square root operation would take using the first square root processing circuitry.

For radicand values of $2^N$, where N is an even number, the result mantissa is set to a value corresponding to 1.0 (i.e. the stored mantissa is 0). On the other hand, if N is an odd number then the result mantissa is set to a value corresponding to $\sqrt{2}$. Since $\sqrt{2}$ is irrational, the result mantissa may be rounded to the nearest value that can be represented using the particular floating-point representation being used. Different rounding modes may round the value up or down, so the second processing circuitry may select between different versions of the $\sqrt{2}$ mantissa depending on the rounding mode selected for the current operation.

On the other hand, the adjusted exponent may depend on both the type of operation being performed and whether the radicand value is an even or odd power of two. The adjusted exponent may be set based on the radicand exponent E as follows:

for $\sqrt{2^{evennumber}}$, the adjusted exponent=E.
for $\sqrt{2^{oddnumber}}$, the adjusted exponent=E−1.
for $$\sqrt{\frac{1}{2^{even\ number}}},$$

the adjusted exponent=−E.
for $$\sqrt{\frac{1}{2^{odd\ number}}},$$

the adjusted exponent=−1−E.

Regardless of how the adjusted exponent is obtained, the adjusted exponent can then be halved and this can be implemented relatively efficiently using a right shift so that the second square root processing circuitry can generate the result much quicker than the first.

The value E shown for the radicand exponent above represents the true, unbiased, exponent value of the radicand. For normal values, the stored value for the exponent is typically a biased exponent value which equals the true exponent value minus a bias value. Hence, for normal values the true exponent value E can be determined relatively easily by adding the bias value. In practice, it may not be necessary to actually add the bias value and instead a set of operations may be applied to the biased exponent value which give the same result as would be the case if the bias value was actually added to produce the true exponent, the adjusted exponent determined as indicated above, the adjusted exponent halved, and the bias then subtracted again to give a biased result exponent.

For subnormal values of the radicand, the stored exponent value typically has a value of 0 which does not represent the true exponent of the subnormal value. Instead, for an exact power of two which is subnormal, the radicand mantissa has only one bit equal to 1, and so it is the bit position of this '1' bit that determines the true exponent E of the radicand value. Therefore, before applying the operations described above, for subnormal radicands the second square root processing circuitry may first determine the true (effective) exponent of the radicand based on the bit position of the '1' bit in the radicand mantissa. For example, for a subnormal value with mantissa 0.000100 . . . the true exponent (the exponent N if the subnormal value is represented as $1 \times 10^N$) is typically −1×(bias+CLZ), where "bias" is the bias value used for the floating point representation being used, and CLZ represents the number of leading zeroes (3 in the example of 0.0001) that precede the '1' bit in the mantissa. Hence, for this example, CLZ is 3 and with double precision floating point the bias value would be 1023, to give a true exponent of −1026. Once the true exponent E has been determined, it can be adjusted to give an adjusted exponent as discussed above, and then halved to give the result exponent. Again, it is not essential for the second square root processing circuitry operation to actually determine the true exponent E of the subnormal value, as instead it may perform a series of operations on the radicand mantissa which give the same result exponent value as would be obtained by actually determining the true exponent E and then proceeding as for normal radicand values.

More particularly, the floating-point square root operation can be performed relatively efficiently using a simple set of operations which vary depending on whether the operation is reciprocal or non-reciprocal, whether the radicand value is normal or subnormal, and whether the radicand value R is an odd-numbered power of two (equal to two to the power of an odd number) or an even-numbered power of two (equal to two to the power of an even number).

For a non-reciprocal operation applied to a normal radicand value R which is an even power of two, the result value can be generated by generating the result mantissa with a value corresponding to 1.0, and generating the result exponent by taking the biased radicand exponent value (which equals the true radicand exponent minus a bias value) inverting the most significant bit, right shifting the result by one bit position (with sign extension), and then inverting the most significant bit of the shifted value. For normal radicand values equal to two the power of an odd number, the non-reciprocal operation is performed in a similar way except that the result mantissa has a value corresponding to $\sqrt{2}$, and after inverting the most significant bit of the biased radicand exponent value, one is subtracted from this value before applying the right shift. The additional subtraction reflects the fact that one of the twos multiplied to give the power of two indicated by an exponent value is square rooted to give the $\sqrt{2}$ value for the result mantissa.

For a non-reciprocal square root operation performed on a subnormal radicand which is an even-numbered power of two, the result mantissa can be generated by setting the result mantissa to a value corresponding to 1.0 or $\sqrt{2}$ (depending on whether the value represents two to the power of an even number of odd number). For both odd/even-numbered powers of two, the result exponent may be determined by determining a leading zero count value (CLZ) which represents a number of leading zeroes in the fractional bits of the radicand mantissa, inverting CLZ, inverting a most significant bit of the inverted CLZ value, and then right shifting the result by one bit position to generate the biased result exponent value. The step of inverting the CLZ effectively determines the true exponent of the subnormal value. The CLZ value may be generated with a number of bits corresponding to the number of bits of the exponent, which may be different for different floating-point representations (e.g. single or double precision). Hence, the wordlength of the CLZ value may match the wordlength of the exponent.

Reciprocal square root operations may be performed in a similar way to non-reciprocal square root operations, except that either before or after the operations performed for the non-reciprocal case, the reciprocal is found. Otherwise, the operations may be the same as in the non-reciprocal case.

FIG. 1 of the accompanying drawings shows how floating-point numbers are stored within a register or memory. In a single precision representation, 32 bits are used to store the floating-point number. One bit is used as the sign bit S, eight bits are used to store the exponent E, and 23 bits are used to store the fractional portion F of the mantissa. For normal values, the 23 bits of the fractional portion F, together with an implied bit having a value of one, make up a 24-bit mantissa 1.F. The radix point is initially assumed to be placed between the implied bit and the 23 stored bits of the mantissa. The stored exponent (or "biased exponent") E is biased by a fixed bias value 127 such that in the represented floating-point number the mantissa is shifted right from its initial position relative to the radix point by E-127 places if E-127 is negative (e.g. if E-127=−2 then a mantissa of 1.01 represents 0.0101), or left from its initial position by E-127 places if E-127 is positive (e.g. if E-127=2 then a mantissa of 1.01 represents 101). The bias is used to make it simpler to compare exponents of two floating-point values as then both negative and positive shifts of the radix point can be represented by a positive value of the stored exponent E. As shown in FIG. 1, the stored representation S[31], E[30:23], F[22:0] represents a number with the value $(-1)^s*1.F*2^{(E-127)}$. A single-precision floating-point number in this form is considered to be "normal". If a calculated floating-point value is not normal (for example, it has been generated with the radix point at a position other than between the left-most two bits of the mantissa), then it is normalized by shifting the mantissa left or right and adjusting the exponent accordingly until the number is of the form $(-1)^s*1.F*2^{E-127}$.

A double precision format is also provided in which the mantissa and exponent are represented using 64 stored bits. The 64 stored bits include one sign bit, an 11-bit exponent and the 52-bit fractional portion F of a 53-bit mantissa 1.F. In double precision format the exponent E is biased by a value of 1023. Thus, in the double precision format a stored representation S[63], E[62:52], F[51:0] represents a floating-point value $(-1)^s*1.F*2^{E-1023}$. It will be appreciated that the present technique could be applied to the single precision format, the double precision format or any other floating-point format which uses different numbers of bits or different bias values for the floating-point representation.

As well as normal floating-point values, the floating-point representation can also represent other quantities. If the exponent E for a value has all its bits set to 1 then this represents a special number, such as infinity and "not a number" (NaN) values, which are results which cannot be represented using a real number such as the square root of a negative number, the division 0/0, the result of a calculation using infinity and the result of a function applied to a value outside its defined range (e.g. the inverse sine or cosine of number less than −1 or greater than +1). When the exponent has all its bits equal to 1, infinity is typically represented by the mantissa bits F all being equal to 0, while other NaN values are represented by non-zero values for the mantissa. Techniques for handling infinity and NaN values are well known and any prior art technique can be used. Therefore the handling of these numbers will not be discussed in detail herein.

When the exponent E has its bits all equal to zero then this represents either zero or a subnormal (also known as "denormal") number. The floating-point value is equal to zero if its mantissa bits F are all zero. If any bit of the mantissa is equal to 1 then the number is a subnormal number. A subnormal number has its implicit bit of the mantissa equal to zero instead of one as in the case of normal numbers. This allows values smaller than the smallest number represented using a normal number. For example, in the single precision case the smallest value representable using a normal number is $1.0*2^{-126}$, while if a denormal number is used than the smallest represent value is $2^{-149}$ ($0.00000000000000000000001*2^{-126}$), since the leading one can now be in the least significant bit of the 23-bit mantissa field F.

FIG. 2 shows an example of a data processing apparatus 2 having a processing pipeline 4 for processing data. The pipeline 4 in this example includes a fetch stage 6 for fetching instructions from memory 8 (which may include a cache), a decode stage 10 for decoding the fetched instructions, an issue stage 12 for checking whether the operands required by the instructions are available and issuing the instructions for execution when the operands become available, and an execute stage 14 for executing the instructions. It will be appreciated that the pipeline may include other stages and may for example permit out-of-order execution. The apparatus 2 may include many other elements not shown in FIG. 2 for the conciseness.

Figure 3:
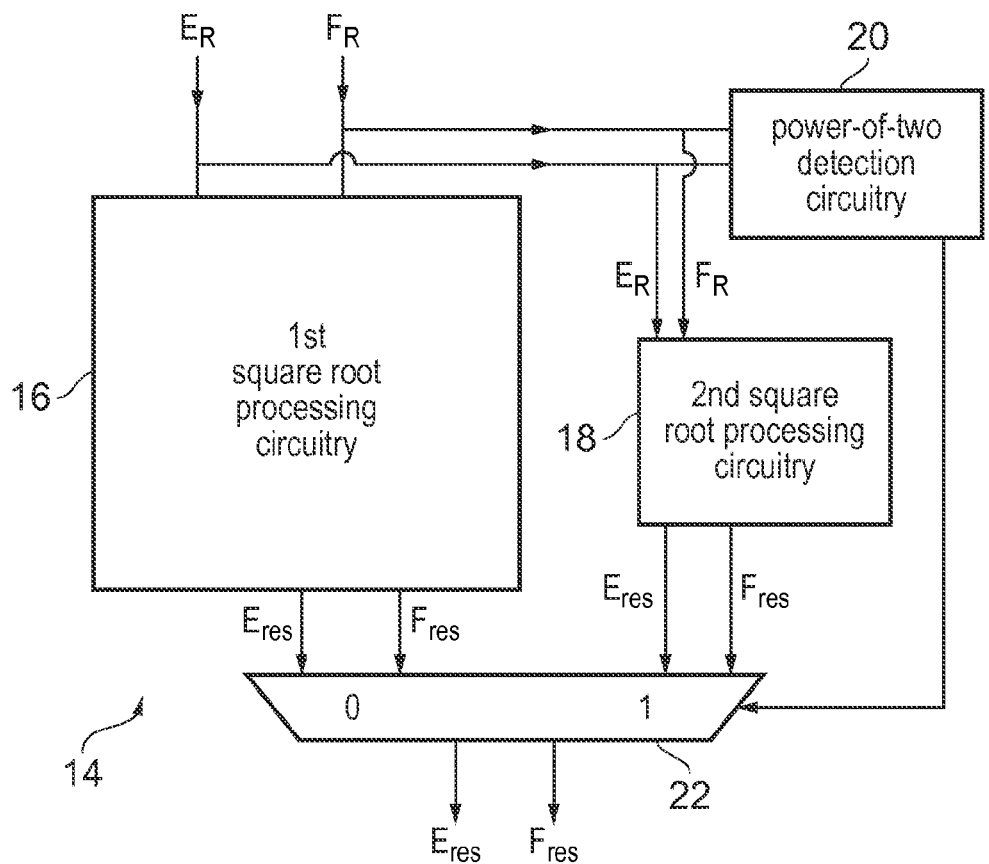
FIG. 3 shows an example of a portion of processing circuitry for performing floating-point square root operations.

FIG. 3 shows a portion of the processing circuitry in the execute stage 14 for performing floating-point square root operations. The processing circuitry includes first square root processing circuitry 16 which receives a radicand value comprising a radicand exponent $E_R$ and a radicand mantissa $F_R$ and generates a result value comprising a result exponent $E_{res}$ and a result mantissa $F_{res}$. In the following examples, the notation $E_R$ or $E_{res}$ represents the stored (biased) exponent which equals the true exponent E of the radicand or the result value minus a bias value, and the notation $F_R$ or $F_{res}$ represents the fractional part of the mantissa, excluding the implicit 1 or 0 bit of the true mantissa 1.F (for a normal value) or 0.F (for a subnormal value).

The first square root processing circuitry 16 can generate square root results for any arbitrary radicand value, and may use any known technique for carrying out floating-point square roots. For example, the first square root processing circuitry 16 may use an iterative method which takes an initial estimate of the square root and then refines the initial estimate in a series of steps until it is closer to the actual square root of the radicand, or a digit-recurrence (digit-by-digit) method which calculates the square root value a bit or digit at a time. Examples of square root computation methods may include the SRT method which uses a series of divisions to determine the square root, or the Newton-Raphson method which uses a series of multiplications. In general, the first square root processing circuitry 16 may take a relatively large number of cycles to generate its result.

When the radicand is an exact power of two then the square root result may be generated more quickly using second square root processing circuitry 18. When the radicand R is a power of two, the result mantissa $F_{res}$ can be set to a fixed value such as 1 or $\sqrt{2}$ and the result exponent $E_{res}$ can be formed simply by halving the radicand exponent or an adjusted radicand exponent as discussed below.

Therefore, in parallel with the radicand exponent $E_R$ and mantissa $F_R$ being provided to the first square root processing circuitry 16, they are also provided to the second square root processing circuitry 18 and the power-of-two detection circuitry 20. The power-of-two detection circuitry 20 detects whether the radicand is an exact power of two. If so, then the power-of-two detection circuitry 20 controls a multiplexer 22 to output the result generated by the second square root processing circuitry 18, while if the radicand R is not an exact power of two then the multiplexer 22 outputs the result generated by the first square root processing circuitry 16. Hence, while the second square root processing circuitry 18 and the power-of-two detection circuitry 20 require a little extra circuitry, which could be considered to merely duplicate functionality already available in the first square root processing circuitry 16, the inventors recognised that this additional overhead is more than compensated for by the fact that the second square root processing circuitry 18 can generate its result significantly earlier than the first square root processing circuitry 16 when the radicand is a power of two.

Figures 4, 5:
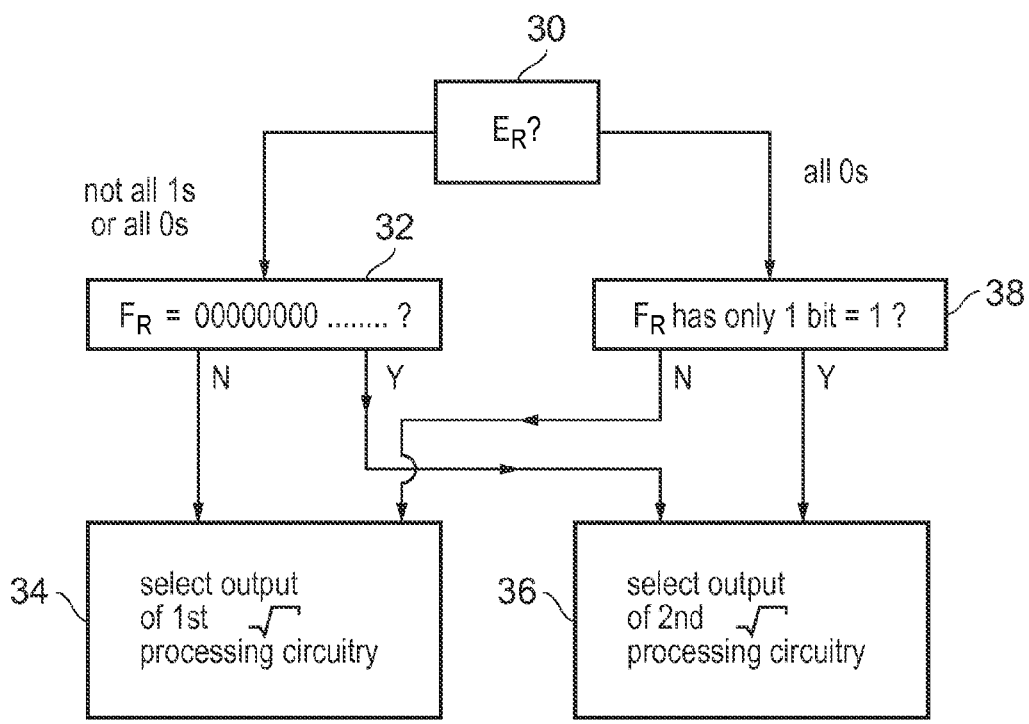
FIG. 4 shows how to calculate a result mantissa and a result exponent for reciprocal and non-reciprocal floating-points square root operations and for even and odd power of two values for the radicand.
FIG. 5 shows a method of how to detect whether the radicand value is an exact power of 2.

FIG. 4 shows a table summarising how the second square root processing circuitry 18 can generate the result mantissa and result exponent. For normal values of the radicand (i.e. the stored radicand exponent value $E_R$ is neither all 0's or all 1's), the effective (true) radicand exponent $E_{eff}$ is equal to the biased exponent value $E_R$ minus the appropriate bias value for the floating-point representation being used (see FIG. 1). For a subnormal value which is an exact power of two, the effective exponent $E_{eff}$ is equal to $-bias-CLZ(F_R)$, where "bias" is the bias value and the function CLZ counts the number of leading zeroes in the stored mantissa $F_R$ (not counting the implicit 0 bit of the mantissa). For example, for a mantissa of 0.01 the number of leading zeroes is 1.

The table of FIG. 4 shows how the result exponent can be determined from the true exponent $E_{eff}$, and also shows how to determine the result mantissa, depending on whether the true exponent is odd or even and whether the operation is a non-reciprocal or reciprocal square root operation.

FIG. 5 shows how the power-of-two detection circuitry 20 may detect whether the radicand value is an exact power of two. At step 30, the power-of-two detection circuitry checks the biased radicand exponent $E_R$. If the exponent $E_R$ is not all 1's and not all 0's, then the radicand value is normal and then at step 32 the power-of-two detection circuitry detects whether the stored mantissa value $F_R$ has all its bits equal to 0 (i.e. the true mantissa including the implicit bit is 1.0000 . . . ). If not, then the radicand is not an exact power of two and at step 34 the power-of-two detection circuitry controls the multiplexer 22 to select the output of the first square root processing circuitry 16. If the mantissa $F_R$ is all 0's, then at step 36 the power-of-two detection circuitry 20 controls the multiplexer 22 to select the output of the second square root processing circuitry 18 which will be available earlier than the output of the first square root processing circuitry 16. This allows subsequent operations using the square root result to start earlier and improves the processing performance of the apparatus 2.

On the other hand, if the stored radicand exponent $E_R$ is all 0's at step 30, then the value is subnormal (assuming that that mantissa is not all 0's indicating a value of 0—this case can be handled separately by any known technique). If the radicand is subnormal, the power-of-two detection circuitry 20 detects at step 38 whether the mantissa $F_R$ has only one bit which is equal to 1 all the other bits equal to 0. If not, then the radicand R is not an exact power of two and so at step 34 the first square root processing circuitry 16 is selected by the multiplexer 22. If the mantissa $F_R$ does have only one bit equal to 1, then at step 36 the output of the second square root process circuitry 18 is selected which again will earlier available than the result from the first circuitry 60. In this way, the floating-point square root operation can be made faster when the radicand is a power of two. The operations at steps 30 and 32 to check whether the exponent $E_R$ or mantissa $F_R$ has all its bits set to 0, or all its bits set to 1, can be performed relatively simply using a series of logic gates (e.g. AND, NOR or NAND gates).

Figure 6:
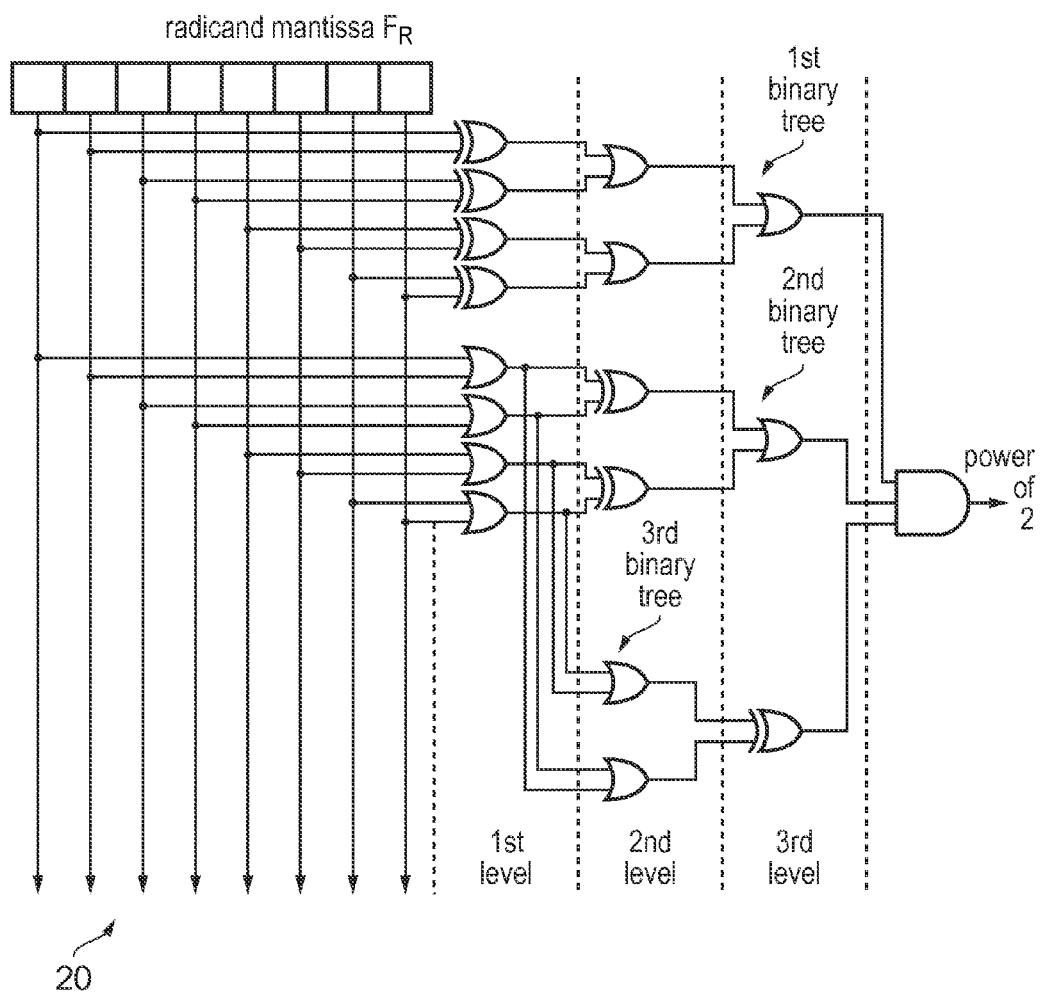
FIG. 6 shows an example of circuitry for detecting whether a mantissa of a subnormal value includes only one bit equal to one.

FIG. 6 shows an example of circuitry within the power-of-two detection circuitry 20 for checking whether the radicand mantissa $F_R$ includes only one bit equal to 1. The circuitry includes logic gates which form binary trees of two-input XOR and OR gates, together with a 3-way AND gate which takes the output of each binary tree as its input. In other words, only if the three binary trees illustrated all generate a value of 1 is the exclusive bit condition determined (i.e. the radicand mantissa $F_R$ contains only one bit which is set) and the output signal generated to signal that the subnormal value is an exact power of two. As can be seen in FIG. 6, a first binary tree comprises XOR gates at a first level of its hierarchy, OR gates at a second level of its hierarchy and a single OR gate at the third level of its hierarchy. A second binary tree comprises OR gates at a first level of it hierarchy, XOR gates a second level of its hierarchy and a final single OR gate at the third level of its hierarchy. The third binary tree comprises OR gates at the first level of its hierarchy, OR gates at the second level of its hierarchy, and a final XOR gate at the third level of its hierarchy. If the output of the first binary tree is set, this indicates that at least one bit is set in the mantissa and this bit is exclusive with respect to its paired neighbour, i.e. its paired neighbour is not set. If the output of the second binary tree is set, this indicates that at least one bit is set in the mantissa and the pair of bit locations in which this at least one bit is set is exclusive with respect to the pair of bit locations next to it, i.e. this adjacent pair of bits has no bits that are set. Finally, if the output of the third binary tree is set, this indicates that the other half of the mantissa (four bits) from the half of the mantissa in which at least one bit is set, does not contain any set bits. If all of these binary tree outputs are set, this indicates that only one bit is set within the mantissa. Accordingly, the output signal is then asserted by the AND gate to indicate that the radicand is an exact power of two. While FIG. 6 shows an example using an 8-bit mantissa for conciseness, the same technique can be extended for larger mantissae by including similar binary trees for checking other portions of the mantissa.

Hence, the power-of-two detection circuitry 20 can detect whether the radicand is an exact power of two and control the multiplexer 22 accordingly. The power of the detection circuitry 20 also controls the second square root processing circuitry 18 which may process the radicand in different ways depending on the type of operation performed and whether the true radicand exponent is even or odd.

Figure 7:
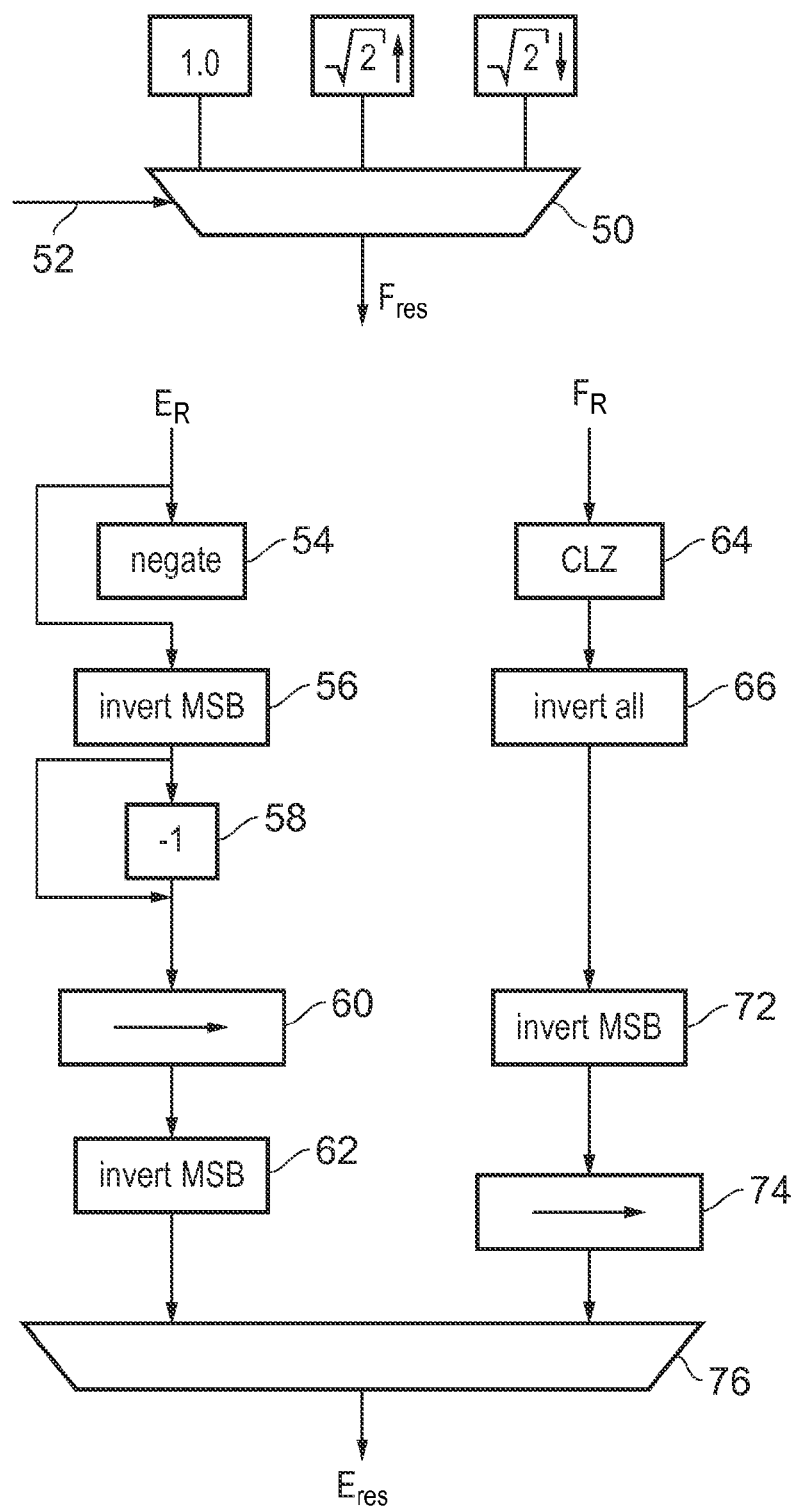
FIG. 7 shows an example of second square root processing circuitry for performing a square root operation on an exact power of two radicand value.

FIG. 7 shows an example of some of the circuitry within the second square root processing circuitry 18. It will be appreciated that this is just an example and that the same results could be achieved using different circuitry or a different arrangement of the same functions. In some cases the second square root processing circuitry 18 may share some components such as a shifter or an inverter with other parts of the processing circuitry 14.

As shown in FIG. 7, the second square root processing circuitry 18 includes a multiplexer 50 which receives a control signal 52 from the power-of-two detection circuitry 20 and in response selects one of several predetermined mantissa values for outputting as the result mantissa $F_{res}$. The available values in this case are values of 1.0, a rounded up version of $\sqrt{2}$ and a rounded down version $\sqrt{2}$. The result mantissa may be set to 1.0 if the radicand has an even true exponent value, and $\sqrt{2}$ may be selected when the radicand has an odd true exponent value of the radicand. For double precision, for example, the rounded $\sqrt{2}$ values are represented in hexadecimal by 1.6A09E667F3BCD and 1.6A09E667F3BCC respectively and the next significant hex-digit would be 9. Similar rounded up and down values for $\sqrt{2}$ may be provided for single precision or other floating point formats. Note that the values of 1.0 and $\sqrt{2}$ represent the true mantissa values—the actual stored mantissa values selected for the result mantissa F, would not include the leading 1 bit, so would correspond to the fractional parts of the mantissa (e.g. 0.0000 . . . for 1.0 and 0.6A09 . . . for $\sqrt{2}$).

For generating the result exponent value $E_{res}$, the second square root processing circuitry 18 in this example includes a negator 54 for generating an exponent value representing an exponent of an opposite sign to the radicand exponent, an inverter 56 for inverting the most significant bit, a decrementer 58 for subtracting one, a right shifter 60 for right shifting by one place (with sign extension) and another inverter 62 for inverting the most significant bit. The pipeline formed by the negator 54, inverter 56, decrementer 58, shifter 60 and inverter 62 may be used when the radicand is normal. The negator 54 and the decrementor 58 may optionally be bypassed. The decrementer 58 is bypassed if the true exponent of the radicand is even and used if the true exponent of the radicand is odd.

The negator 54 is used if the floating-point square root operation is a reciprocal square root operation for determining operation for determining $$\sqrt{\frac{1}{R}},$$

and bypassed for the non-reciprocal square root operation $\sqrt{R}$. In general the negator 54 may generate an exponent value which represents a true exponent of the opposite sign to the radicand exponent $E_R$. For example, if the true exponent is +57, the negator would generate an exponent value representing −57. In practice this can be done in several ways. The operation performed by the negator may correspond to removing the bias value, negating the result to produce a value of the opposite sign, and then applying the bias value again. In practice, it may not be necessary to actually carry out these operations. For example, the way in which the bias value is defined in practice means that these operations may be equivalent to simply inverting all the bits of the exponent radicand $E_R$ and then subtracting one, to produce a biased exponent value representing the opposite sign.

Similarly, for handling subnormal values, the second square root processing circuitry 18 includes a pipeline comprising a leading zero counter 64 for generating a leading zero count value CLZ, an inverter 66 for inverting all the bits of the CLZ value, an inverter 72 for inverting the most significant bit, and a right shifter 74 for right shifting by one place (with sign extension).

A multiplexer 76 selects the output of the normal pipeline or the subnormal pipeline as appropriate. While FIG. 7 shows the normal pipeline and the subnormal pipeline being entirely separate, in other implementations units may be shared between the pipelines. For example, only one shifter could be provided and then this could be selected to act as the shifter 60 or 74 as appropriate.

FIGS. 8 to 11 show various examples of calculating the result mantissa and exponent using the second square root processing circuitry 18.

As shown in FIG. 8, for a non-reciprocal square root of a normal radicand R which is an even power of two, the operations to be performed are as follows:

select 1.0 for the result mantissa F.

invert the most significant bit of the biased exponent $E_R$ using inverter 56.

right shift the output of the inverter 56 by one place using shifter 60 (with sign extension).

re-invert the most significant bit of the output of the shifter using inverter 62, to give the biased result exponent $E_{res}$.

FIG. 8 shows two examples of this approach, showing that it works for both positive and negative exponents. This approach works because the right shift has the effect of dividing the exponent by two, and the inverting and re-inverting of the most significant bit essentially removes the bias and then reapplies the bias so that the shift acts on the unbiased true exponent value.

FIG. 9 shows similar examples where the non-reciprocal square root operation is applied to a normal radicand which is an odd numbered power of two. This means that the unbiased exponent is odd, i.e. the biased exponent is even. In this case, the operations to be performed are as follows:

set the result mantissa $F_{res}$ to the appropriate $\sqrt{2}$ word length fraction (which may be 52 or 24 bits depending on whether double or single position floating-point is used), rounded in accordance with the current active rounding mode as discussed above.

invert the most significant bit of the biased radicand exponent $E_R$ using inverter 56.

subtract 1 using decrementer 58.

right shift the output of decrementer 58 by one bit position using shifter 60 (again, with sign extension).

re-invert the most significant bit of the shifter output to give the biased result exponent $E_{res}$.

Again, FIG. 9 shows that this gives a correct result for both the positive and negative true exponent values. When the true exponent is odd, the subtracting step using the decrementer 58 is used to reduce the true exponent to the nearest even value and the multiplier of two which comes out of the exponent is square rooted to give the $\sqrt{2}$ value for the mantissa (for example, $\sqrt{1.0 \times 2^{57}} = \sqrt{2 \times 2^{56}} = \sqrt{2} \times 2^{28}$).

The reciprocal square root operation can be performed in a similar way to the techniques shown in FIGS. 8 and 9. Other than using the negator 54 to change the sign of the exponent as discussed above, the other operations performed are the same as for the non-reciprocal case. This works because a reciprocal square root operation performed on an exact power of two for which the true exponent is "E" is equivalent to performing a non-reciprocal square root operation performed on an exact power of two for which the true exponent is "−E".

FIG. 10 shows an example of using the second square root processing circuitry 18 to handle subnormal values. When the value is subnormal then the stored exponent value $E_R$ is all 0's and the mantissa is equal to 0.????, where the bits represented by the question marks can be either 0 or 1. The value will be an exact power of two if only one of the bits following the radix point is equal to 1. In this case the true exponent $E_{off}$ is determined based on the bias value and leading zero count of the mantissa. For example, for $1.0 \times 2^{-1034}$ the mantissa is 0.0000_0000_0001 and so the bias minus the leading zero count=−1023−11=−1034.

If the true exponent of the subnormal value is even, and the operation being performed is the non-reciprocal square root operation, the result is generated as follows:
  set the result mantissa $F_{res}$ to 1.0.
  determine the leading zero count CLZ of the radicand mantissa $F_R$ using leading zero counter 64.
  invert all bits of CLZ using inverter 66 to give a value having the same number of bits as the exponent in the current floating-point representation (11 bits in this case).
  invert the most significant bit using inverter 72.
  right shift by one place with sign extension using shifter 74 to give the biased result exponent $E_{res}$ which will be represent a normal floating-point value.

As shown in FIG. 10, this gives the correct outcome. Inverting the CLZ value is essentially the same as adding the bias value to the CLZ value, to give the magnitude of the true exponent (the final bit of the inverted CLZ value may not be correct, but it will get shifted out of the eventual result in the following shift step, so this does not affect the final result). Right shifting this value by one place then essentially halves the true exponent to give the square root exponent a result.

Similarly, FIG. 11 shows the subnormal case where the radicand has an odd true exponent. In this case, the result exponent is calculated in the same way as for an even true exponent, but a $\sqrt{2}$ fraction is selected for the mantissa. Hence, in this case the operations performed are:
  select $\sqrt{2}$ for the result mantissa $F_{res}$.
  generate the CLZ count using CLZ counter 64.
  invert all the bits of the CLZ count using inverter 66.
  invert the most significant bit using inverter 72.
  right shift one place (again, with sign extension) using shifter 74 to give the biased result exponent $E_{res}$.

As shown in FIG. 11, this again gives the correct result.

The following examples show that this technique works for both double and single precision subnormal values (each number's base is represented by a subscript following that number):

Double Precision—CLZ Value has 11 Bits
$1.0 * 2^{-1034} \rightarrow$ e(biased)=0, f=0.0010 ... $_{16}$(DP), CLZ(f)= $00B_{16}$=000_0000_1011$_2$  inv(CLZ(f))=$7F4_{16}$=111_1111_0100$_2$;
$\sqrt{(1.0 * 2^{-1034})} = 1.0 * 2^{-517} \rightarrow$ e(biased)=(−517+1023)$_{10}$= $1FA_{16}$=001_1111_1010$_2$ f=0 (DP)
$1.0 * 2^{-1033} \rightarrow$ e(biased)=0, f=0.0020 ... $_{16}$(DP), CLZ(f)= $00A_{16}$=000_0000_1010$_2$  inv(CLZ(f))=$7F5_{16}$=111_1111_01012;
$\sqrt{(1.0 * 2^{-1033})} = \sqrt{(2.0 * 2^{-1034})} = 1.414 ... * 2^{-517} \rightarrow$ e(biased)= (−517+1023)$_{10}$=$1FA_{16}$=001_1111_1010$_2$  f=1.6A09E667F 3BCC_9$_{16}$(DP, g & st set) (DP)

Single Precision—CLZ Value has 8 Bits
$1.0 * 2^{-134} \rightarrow$ e(biased)=0, f=0.010 ... $_{16}$(SP), CLZ(f)= $07_{16}$=0000_0111$_2$ inv(CLZ(f))=$F8_{16}$=1111_1000$_2$;
$\sqrt{(1.0 * 2^{-134})} = 1.0 * 2^{-67} \rightarrow$ e(biased)=(−67+127)$_{10}$=$3C_{16}$= 0011_1100$_2$ f=0 (SP)
$1.0 * 2^{-133} \rightarrow$ e(biased)=0, f=0.020 ... $_{16}$(SP), CLZ(f)= $06_{16}$=0000_0110$_2$ inv(CLZ(f))=$F9_{16}$=1111_1001$_2$;
$\sqrt{(1.0 * 2^{-133})} = \sqrt{(2.0 * 2^{-134})} = 1.414 ... * 2^{-67} \rightarrow$ e(biased) (−67+127)$_{10}$=$3C_{16}$=0011_1100$_2$ f=1.6A09E6_6$_{16}$(SP, g not set, sticky set)

For reciprocal square root for subnormal values, the non-reciprocal square root can be determined in the usual way to determine a value X, and then the reciprocal 1/X can be found. For an even power of two subnormal value as in the example of FIG. 10, this can be done by negating the result exponent in a similar way to the operation discussed above for negator 54 (e.g. to convert the non-reciprocal result $1.0 * 2^{-517}$ as generated in FIG. 10 to the reciprocal square root result $1.0 * 2^{-517}$). For an odd power of two subnormal value as in the example FIG. 11, this can be done by negating the result exponent and subtracting one (e.g. to convert the non-reciprocal result $\sqrt{2} * 2^{-517}$ into its reciprocal $\sqrt{2} * 2^{-516}$. Otherwise, the reciprocal square root operation can be performed in a similar way to the non-reciprocal square root operation.

Although illustrative embodiments have been described in detail herein with reference to the accompanying drawings, it is to be understood that the invention is not limited to those precise embodiments, and that various changes and modifications can be effected therein by one skilled in the art without departing from the scope of the appended claims.

The invention claimed is:
1. A data processing apparatus comprising:
processing circuitry configured to perform a floating-point square root operation for determining a square root of a radicand value R having a radicand exponent and a radicand mantissa to generate a result value having a result exponent and a result mantissa;
wherein the processing circuitry comprises:
first square root processing circuitry configured to perform the floating-point square root operation for radicand values which are not an exact power of two;
second square root processing circuitry configured to perform the floating-point square root operation for radicand values which are an exact power of two, wherein the second square root processing circuitry is configured to generate the result value in fewer processing cycles than the first square root processing circuitry; and
power-of-two detection circuitry configured to detect whether the radicand value is an exact power of two, to control the processing circuitry to output the result value generated by the first square root processing circuitry if the radicand value is not an exact power of two, and to control the processing circuitry to output the result value generated by the second square root processing circuitry if the radicand value is an exact power of two.

2. The data processing apparatus according to claim 1, wherein the power-of-two detection circuitry is configured to detect whether the radicand value is an exact power of two in parallel with the first square root processing circuitry starting to perform the floating-point square root operation on the radicand value.

3. The data processing apparatus according to claim 1, wherein if the radicand value is a normal value, the power-of-two detection circuitry is configured to detect that the radicand value is an exact power of two if the radicand mantissa has a value of 1.0.

4. The data processing apparatus according to claim 1, wherein if the radicand value is a subnormal value, the power-of-two detection circuitry is configured to detect that the radicand value is an exact power of two if the radicand mantissa includes only one bit having a value of 1.

5. The data processing apparatus according to claim 1, wherein the floating-point square root operation comprises one of:
   (i) a non-reciprocal floating-point square root operation for generating the result value equal to $\sqrt{R}$; and
   (ii) a reciprocal floating-point square root operation for generating the result value equal to $$\sqrt{\frac{1}{R}}.$$

6. The data processing apparatus according to claim 1, wherein the second square root processing circuitry is configured to generate the result value with:
   the result mantissa having a predetermined mantissa value; and
   the result exponent having a value corresponding to half an adjusted exponent.

7. The data processing apparatus according to claim 6, wherein the predetermined mantissa value and the adjusted exponent are selected depending on whether the radicand value R is equal to two to the power of an even number or equal to two to the power of an odd number.

8. The data processing apparatus according to claim 7, wherein if the radicand value R is equal to two to the power of an even number, then the predetermined mantissa has a value corresponding to 1.0.

9. The data processing apparatus according to claim 7, wherein if the radicand value R is equal to two to the power of an odd number, then the predetermined mantissa has a value corresponding to the square root of two.

10. The data processing apparatus according to claim 7, wherein if the floating-point square root operation is a non-reciprocal floating-point square root operation for generating the result value equal to $\sqrt{R}$, and the radicand value R is equal to two to the power of an even number, then the adjusted exponent equals the radicand exponent.

11. The data processing apparatus according to claim 7, wherein if the floating-point square root operation is a non-reciprocal floating-point square root operation for generating the result value equal to $\sqrt{R}$, and the radicand value R is equal to two to the power of an odd number, then the adjusted exponent equals the radicand exponent minus one.

12. The data processing apparatus according to claim 7, wherein if the floating-point square root operation is a reciprocal floating-point square root operation for generating the result value equal to $$\sqrt{\frac{1}{R}}$$

and the radicand value R is equal to two to the power of an even number, then the adjusted exponent equals −E, where E is the radicand exponent.

13. The data processing apparatus according to claim 7, wherein if the floating-point square root operation is a reciprocal floating-point square root operation for generating the result value equal to $$\sqrt{\frac{1}{R}}$$

and the radicand value R is equal to two to the power of an odd number, then the adjusted exponent equals −E−1, where E is the radicand exponent.

14. The data processing apparatus according to claim 7, wherein if the radicand value is a subnormal value which is an exact power of two, then the radicand mantissa has only one bit equal to 1 and a radicand exponent value equal to 0, and the second square root processing circuitry is configured to determine the radicand exponent E based on the position of said one bit equal to 1 within the radicand mantissa value.

15. The data processing apparatus according to claim 1, wherein if the floating-point square root operation is a non-reciprocal floating-point square root operation for generating the result value equal to $\sqrt{R}$, and the radicand value R is a normal value equal to two to the power of an even number, then the second square root processing circuitry is configured to generate the result value by:
   generating the result mantissa with a value corresponding to 1.0;
   inverting a most significant bit of a biased radicand exponent value to generate a first intermediate value, where the biased radicand exponent value equals the radicand exponent minus a bias value;
   right shifting the first intermediate value by one bit position to generate a second intermediate value; and
   inverting the most significant bit of the second intermediate value to generate a biased result exponent value equal to the result exponent minus the bias value.

16. The data processing apparatus according to claim 1, wherein if the floating-point square root operation is a non-reciprocal floating-point square root operation for generating the result value equal to $\sqrt{r}$, and the radicand value R is a normal value equal to two to the power of an odd number, then the second square root processing circuitry is configured to generate the result value by:
   generating the result mantissa with a value corresponding to the square root of two;
   inverting the most significant bit of a biased radicand exponent value to generate a first intermediate value, where the biased radicand exponent value equals the radicand exponent minus a bias value;
   subtracting one from the first intermediate value to generate a second intermediate value;
   right shifting the second intermediate value by one bit position to generate a third intermediate value; and
   inverting the most significant bit of the third intermediate value to generate a biased result exponent value equal to the result exponent minus the bias value.

17. The data processing apparatus according to claim 1, wherein if the floating-point square root operation is a non-reciprocal floating-point square root operation for generating the result value equal to $\sqrt{R}$, if the radicand value R is a subnormal value equal to two to the power of an even number, then the second square root processing circuitry is configured to generate the result exponent by:
- determining a leading zero count value representing a number of leading zeroes in a radicand mantissa value, wherein the radicand mantissa value comprises the fractional bits of the radicand mantissa;
- inverting the leading zero count value to generate an inverted leading zero count value;
- inverting a most significant bit of the inverted leading zero count value to generate an adjusted inverted leading zero count value; and
- right shifting the adjusted inverted leading zero count value by one bit position to generate a biased result exponent value equal to the result exponent minus a bias value.

18. A data processing apparatus comprising:
- processing means for performing a floating-point square root operation for determining a square root of a radicand value R having a radicand exponent and a radicand mantissa to generate a result value having a result exponent and a result mantissa;
- wherein the processing means comprises:
- first square root processing means for performing the floating-point square root operation for radicand values which are not an exact power of two;
- second square root processing means for performing the floating-point square root operation for radicand values which are an exact power of two, wherein the second square root processing circuitry is configured to generate the result value in fewer processing cycles than the first square root processing circuitry; and
- power-of-two detection means for detecting whether the radicand value is an exact power of two, controlling the processing means to output the result value generated by the first square root processing means if the radicand value is not an exact power of two, and controlling the processing means to output the result value generated by the second square root processing means if the radicand value is an exact power of two.

19. A method for performing a floating-point square root operation for determining a square root of a radicand value R having a radicand exponent and a radicand mantissa to generate a result value having a result exponent and a result mantissa; the method comprising:
- detecting whether the radicand value is an exact power of two by power-of-two detection circuitry;
- if the radicand value is not an exact power of two, outputting the result value generated by first square root processing circuitry configured to perform the floating-point square root operation for radicand values which are not an exact power of two; and
- if the radicand value is an exact power of two, outputting the result value generated by second square root processing circuitry configured to perform the floating-point square root operation for radicand values which are an exact power of two, wherein the second square root processing circuitry is configured to generate the result value in fewer processing cycles than the first square root processing circuitry.

\* \* \* \* \*